United States Patent
Ehrmaier et al.

(10) Patent No.: US 7,028,575 B2
(45) Date of Patent: Apr. 18, 2006

(54) TRANSMISSION SHIFTING MECHANISM

(75) Inventors: Rudolf Ehrmaier, Munich (DE); Norbert Woeste, Munich (DE); Josef Neuner, Raubling (DE)

(73) Assignee: Bayerische Motoren Werke AG, Munich (DE)

( * ) Notice: Subject to any disclaimer, the term of this patent is extended or adjusted under 35 U.S.C. 154(b) by 239 days.

(21) Appl. No.: 10/354,126

(22) Filed: Jan. 30, 2003

(65) Prior Publication Data

US 2003/0172762 A1 Sep. 18, 2003

(30) Foreign Application Priority Data

Feb. 20, 2002 (DE) ........................................ 102 06 985

(51) Int. Cl.
*B60K 20/00* (2006.01)

(52) U.S. Cl. ................. 74/473.18; 74/473.12; 74/473.21

(58) Field of Classification Search ............... 74/473.18, 74/335, 473.12, 473.1, 473.21, 473.24, 473.25, 74/473.26
See application file for complete search history.

(56) References Cited

U.S. PATENT DOCUMENTS

| | | | | |
|---|---|---|---|---|
| 6,209,410 | B1 * | 4/2001 | Suzuki ..................... | 74/473.18 |
| 6,230,579 | B1 * | 5/2001 | Reasoner et al. ......... | 74/473.18 |
| 6,237,435 | B1 * | 5/2001 | Gronhage et al. ..... | 74/471 XY |
| 6,397,698 | B1 * | 6/2002 | Kamiya et al. .......... | 74/473.11 |
| 6,761,084 | B1 * | 7/2004 | Suzuki et al. ............ | 74/473.33 |
| 2001/0004850 | A1 * | 6/2001 | Kim ........................ | 74/473.12 |
| 2002/0026846 | A1 * | 3/2002 | Lee .......................... | 74/473.18 |
| 2003/0056613 | A1 * | 3/2003 | Altenkirch et al. ...... | 74/473.18 |

* cited by examiner

*Primary Examiner*—David M. Fenstermacher
(74) *Attorney, Agent, or Firm*—Crowell & Moring LLP

(57) ABSTRACT

Monostable shifting mechanism, in which two shifting channels are provided for the shift lever. "Monostable" means that the shifting element or the shift lever has only one stable position. As a function of the actual "operating condition" of the shifting mechanism, certain other operating conditions can be selected by means of the deflection of the shift lever. For this purpose, the shift lever is deflected manually in either one or the other shifting channel and, after the release, automatically returns into the stable starting position from any possible deflected position.

20 Claims, 3 Drawing Sheets

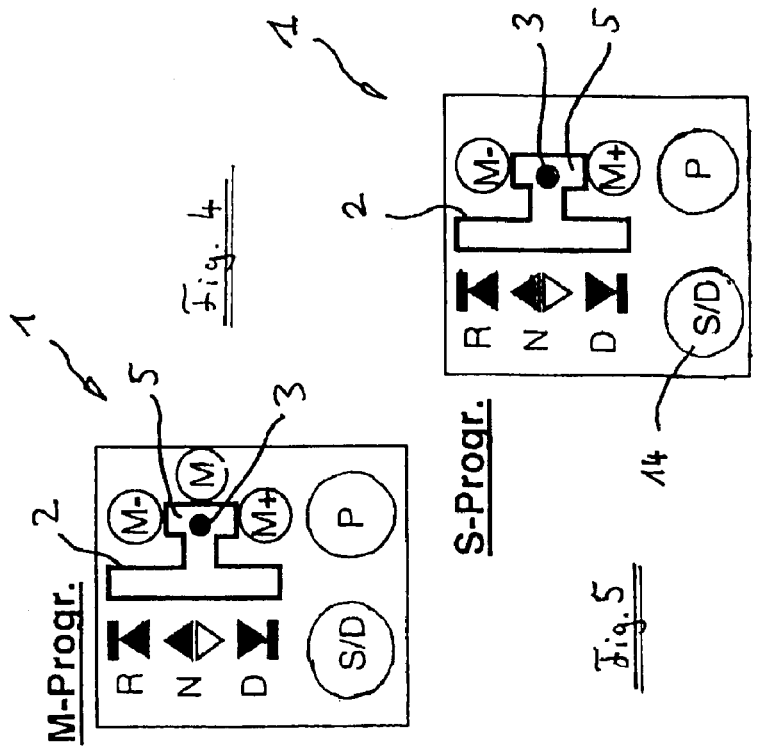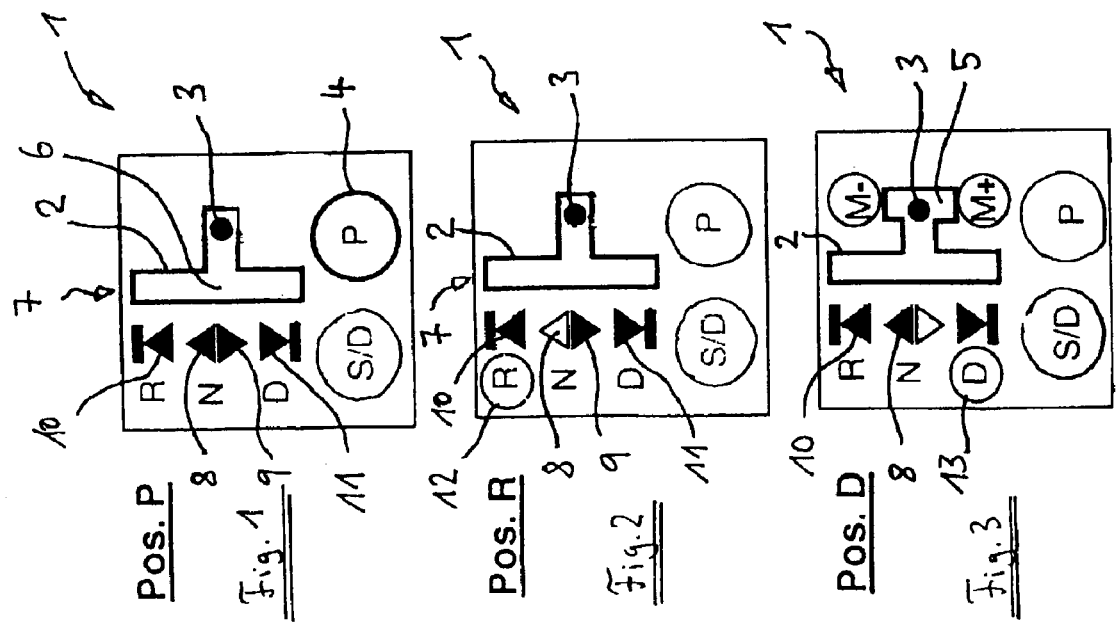

TRANSMISSION SHIFTING MECHANISM

This application claims the priority of Patent Document No. 102 06 985.9, filed in Federal Republic of Germany on Feb. 20, 2002, the disclosure of which is expressly incorporated by reference herein.

BACKGROUND AND SUMMARY OF THE INVENTION

The present invention relates to a shifting mechanism.

Modern automatic passenger car transmissions and so-called "automated manual transmissions" frequently have a so-called "two-channel shifting mechanism," that is, they can optionally be operated in an automatic mode or can be manually shifted by way of a so-called touch shifting mechanism.

DE 199 38 528 A1 disclosed an automatic transmission with a two-channel shifting mechanism. By way of a linkage or a Bowden cable, the gear shift lever is mechanically connected with the transmission and can optionally be moved in a left or in a right shifting channel. By way of the left shifting channel, the individual operating conditions of a conventional transmission can be selected, specifically, the parking condition, the reversing condition, the neutral condition and the drive condition, in which individual forward gears are automatically shifted by a transmission control. From the drive condition, the gear shift lever can automatically be moved into the "right shifting channel," in which manual shifting is possible which is hereinafter called a "step-by-step shifting condition." In the right shifting channel, the shifting lever has a stable center position and can optionally be pressed toward the front or "touched" toward the rear, which permits a manual upshifting or downshifting.

An object of the invention is to provide a shifting mechanism for an automatic transmission which is improved with respect to its shifting ergonomy and which, in particular, better meets the demands of sporty vehicles, for example, to prevent faulty operation.

One aspect of the invention concerns "monostable shifting," where two shifting channels are provided. "Monostable" means that the shifting element or the shift lever has only a single stable position. As a function of the actual "operating condition" of the shifting mechanism, certain other operating conditions can be selected by deflecting the shift lever. For this purpose, the shift lever is manually deflected either in one or the other shifting channel and, after being released, automatically returns from any possible deflected position to the stable starting position.

Preferably, two parallel shifting channels are provided which are arranged side-by-side. In its stable position, the shifting element or the shift lever is situated in one of the two shifting channels which, for the purpose of differentiation, is called a "first shifting channel." The shift lever can be touched in the first shifting channel, that is, it can be swivelled toward the front or the rear. The shift lever can also be moved from the stable position in a direction transverse to the shifting channels into a center position of the other shifting channel which is called a second shifting channel. From the center position in the second shifting channel, the shift lever can be moved either toward the front into a forward neutral position or still farther into a forward end position or toward the rear into a rearward neutral position or still farther into a rearward end position.

It is explicitly pointed out that the terms "forward" or "rearward" as well as "left" or "right" in the following description and in the claims are not understood to necessarily be spatial and are definitely not limiting. These terms are selected only for a clear differentiation of the individual positions.

As a function of the actual operating condition of the shifting mechanism, the reversing condition, the neutral condition or the drive condition can be selected by way of the shift lever in the second shifting channel. The first shifting channel is provided for the step-by-step shifting condition. The selection of individual driving operation conditions will be explained in detail in connection with the drawing.

According to a further development of the invention, the reversing condition is selected by a movement of the shift lever toward the "forward left," as in the case of many conventional manual transmissions. This means that, for selecting the reversing condition, the shift lever is moved from the stable position toward the left into the second shifting channel and from there toward the front into its forward end position. Thus, a driver who is accustomed to a conventional manual transmission does not have to adapt himself for selecting the reversing condition.

For selecting the drive condition, that is, the "automatic mode," in which the individual forward gears of the transmission are automatically shifted by a transmission control, the shift lever has to be moved toward the "rearward left." This means that the shift lever has to be moved from its stable center position first transversely into the second shifting channel and then into its rearward end position.

To select the neutral condition as a function of the actual operating condition, the shift lever must be moved into the forward neutral position, which is situated between the center position and the forward end position in the second shifting channel, or into the rearward neutral position which is situated between the center position and the rearward end position in the second shifting channel. When the shifting mechanism is in the reversing condition, the shifting element has to be moved into the rearward neutral position for this purpose. If, in contrast, the shifting mechanism is in the drive condition, the shifting element has to be moved into the forward neutral position.

According to a further development of the invention, a shift into the neutral condition automatically takes place when the shifting mechanism is in the reversing condition and the shifting element is moved in the longitudinal direction of the first shifting channel.

According to a further development of the invention, the step-by-step shifting condition can be selected only when the shifting mechanism is in the drive condition. This means that, from the reversing condition or the neutral condition, a shift directly into the step-by-step shifting condition cannot be made for reasons of safety.

When the shifting mechanism is in the drive condition, a change into the step-by-step shifting condition can easily and comfortably take place. For this purpose, the shifting element or shift lever only needs to be deflected from its stable position in the longitudinal direction of the first shifting channel, that is, the shift lever only needs to be touched briefly.

When the shifting mechanism is in the drive condition and if the shift lever is slightly touched in the first shifting channel, a shift into the step-by-step shifting condition takes place. The step-by-step shifting condition can also be called an "M Program" (Manual Shifting Program). During the first touch of the shifting element for a shift out of the drive condition, it may be provided that the momentary gear be held. When the shifting mechanism is in the step-by-step shifting condition and the shift lever is deflected from its stable position toward the front or rear, a "manual" upshift or downshift takes place, that is, a shift takes place only if the driver operates the shift lever in the first shifting channel.

Furthermore, a sports program (S Program) may be provided. From the drive condition, a shift into the S Program may take place, for example, by operating an "S/D key." However, a shift from the drive condition into the S Program may also take place by a one-time touching of the shift lever in the first shifting channel. The S Program is a "second automatic mode" which differs from the automatic mode of the drive condition with respect to its shifting characteristics. It may, for example, be designed as a "Sports Program" in that the individual shifts take place at higher speeds. From the S Program, a manual upshifting or downshifting can take place by moving the shift lever in the first shifting channel.

It was mentioned above that, possibly for safety reasons, it may be provided that the step-by-step shifting condition or the S Program can be selected only when the shifting mechanism is actually in the drive condition. For this purpose, a "monitoring device" is provided. The monitoring device may be a "passive" electronic safety system which, during a longitudinal movement of the shifting element in the first shifting channel, permits a shift into the step-by-step shifting condition only when the shifting mechanism is in the drive condition. This means that, although the electronic monitoring system permits a movement of the shifting element in the first shifting channel in any operating condition, it allows a shift into the step-by-step shifting condition only when the shifting mechanism is in the drive condition.

As an alternative, a mechanical blocking device may be provided which permits a longitudinal movement of the shifting element or shift lever in the first shifting channel only when the shifting mechanism is in the drive condition or when the step-by-step shifting condition is already active and the driver wants to upshift or downshift manually.

According to a further development of the invention, the shifting mechanism can be shifted from the step-by-step shifting condition by way of two different deflection paths of the shifting element into the drive condition. As mentioned above, the drive condition can, on the one hand, be selected by moving the shift lever "to the rearward left," that is, from the stable position into the second shifting channel and then into one of the two end positions. In addition, there is the possibility of selecting the drive condition by an "opposed" transverse movement. The drive condition can therefore also be selected by a transverse movement from the stable position into a position which is opposed to the second shifting channel. If, for example, the second shifting channel is situated on the left next to the stable position of the shift lever or on the left next to the first shifting channel, the drive condition can be selected by moving the shift lever toward the "rearward left" or by a transverse movement toward the right. This additional selection possibility for the drive condition considerably improves the shifting comfort because the driver only has to move the shift lever into a transverse direction toward the right.

It may preferably be provided that, as a result of the above-mentioned additional "degree of transverse freedom" of the shift lever, a shift can take place between the automatic mode of the drive condition, the step-by-step shifting condition (M Program) and the sports program (S Program).

In addition, an "operating element" is preferably provided for selecting a parking condition. The operating element may, for example, be an electric key which is integrated in the shifting element or the shift lever. Optionally, a second "operating element" may be provided for selecting the parking condition, which operating element may, for example, be coupled with a switching device for the "switching-on or switching-off" of a vehicle power supply. The second operating element can be formed, for example, by the ignition lock or an "off switch" so that, when the vehicle is parked, the shifting mechanism automatically shifts into the parking condition.

As a function of the actual operating condition, the shifting possibilities can be summarized as follows:

In the parking condition, the neutral condition can be selected by deflecting the shifting element from the stable position into the forward or rearward neutral position. The drive condition or the reversing condition can be selected by deflecting the shifting element into one of the two end positions of the second shifting channel. At least in the case of "true" automatic vehicles, the step-by-step shifting condition cannot be selected directly from the parking condition.

In the reversing condition, the neutral condition can be selected by deflecting the shifting element from the stable position into the rearward neutral position of the second shifting channel. The drive condition can be selected by deflecting the shifting element into the rearward end position. At least in the case of "true" automatic vehicles, the step-by-step shifting condition also can not be selected from the reversing condition.

In the neutral condition, the reversing condition can be selected by deflecting the shifting element from the stable position into the forward end position. The drive condition can be selected by deflecting the shifting element into rearward end position. At least in the case of "true" automatic vehicles, the step-by-step shifting condition can also not be directly selected from the neutral condition.

In the drive condition, the neutral condition can be selected by deflecting the shifting element from the stable position into the forward neutral position, and the reversing condition can be selected by deflecting the shifting element into the forward end position. In addition, the step-by-step condition can be selected by deflecting the shifting element from the stable position in the longitudinal direction of the first shifting channel. In other words, by another deflection or touching of the shifting element in the first shifting channel, the individual forward gears can be manually upshifted or downshifted. Furthermore, a shift into the sports program can take place from the drive condition by way of an "operating element," such as an S/D key. However, it may also be provided that the S Program can be reached from the drive condition by a one-time deflection of the shift lever in the first shifting channel, and a manual upshift or downshift can take place by a repeated deflection.

In the step-by-step shifting condition, the neutral condition can be selected by deflecting the shifting element from the stable position into the forward neutral position of the second shifting channel, and the reversing condition can be selected by deflecting the shifting element into the forward end position. The drive condition can be selected by deflecting the shifting element from the stable position into the rearward end position of the second shifting channel. Furthermore, a shift can take place from the step-by-step shifting condition by way of an "operating element," such as an S/D key, into the sports program. Furthermore, naturally, by deflecting or touching the shifting element in the first shifting channel, upshifts or downshifts can be made.

As an alternative or in addition, it can also be provided that a change-over shift can be carried out between the step-by-step shifting condition, the drive condition and the sports program by a movement of the shift lever in the transverse direction with respect to the shifting channels.

The shifting element is preferably constructed as a "joystick." This means that the shift lever is not "mechanically" connected with the transmission but electrically connected with a transmission control unit which controls the shifting operation in the transmission by way of transmission actuators.

The shifting element or the shift lever is preferably assigned a desired shifting force characteristic. It may, for example, be provided that the shifting force for deflecting the shifting element from the stable position of the first shifting channel into the center position of the second shifting channel is essentially dependent in a linear manner on the deflection path of the stable position. The shifting force for this "transverse movement" may, for example, be constant or increasing in a slightly linear manner.

With respect to the movement of the shifting element in the second shifting channel, a shifting force can be provided which has several maximum values. Starting from the center position, the shifting force first increase to a first maximum when the shift lever is moved into the forward or rearward neutral position. Then the shifting force decreases again slightly, whereby the driver is haptically provided with the feeling that the forward or rearward neutral position has been reached.

When the driver moves the shift lever further toward the front or the rear, the shifting force rises to a second shifting force maximum. This second shifting force maximum is greater than the first shifting force maximum. For selecting the reversing condition or the drive condition by way of the second shifting channel, the driver therefore has to apply a higher shifting force. When the driver overcomes this second shifting force maximum, he haptically receives a feedback because the shifting force will slightly decrease again. This indicates to the driver that he has reached the position for selecting the reversing condition or the drive condition. If he subsequently releases the shift lever, the shift lever will automatically return to the stable position in the first shifting channel.

According to a further development of the invention, a display unit is provided which has a shifting diagram displaying the possible deflecting positions of the shifting element from the stable position. The deflecting positions for selecting the individual actually selectable operating conditions are indicated in the shifting diagram by assigned symbols. In addition to the actual operating condition, preferably only those operating conditions are schematically indicated which can be selected as a function of the actual operating condition.

Preferably, the actual operating condition is visually highlighted in the shifting diagram with respect to the actually selectable operating conditions, for example, by a different color or brightness.

Preferably at least one display element of the display device is visible in the drive condition and in the step-by-step shifting condition, which display element displays the selection option "step-by-step shifting condition" in the drive condition and displays the "manual shifting option" in the step-by-step shifting condition.

According to a further development of the invention, the display device has a luminous marking which indicates the stable position of the shifting element. When the shifting element or the shift lever are deflected, this marking will be extinguished. However, according to a further development of the invention, it may be provided that the luminous marking, which shows the position of the shift lever, will "move along" during a movement of the shift lever in the shifting diagram of the display device.

Other objects, advantages and novel features of the present invention will become apparent from the following detailed description of the invention when considered in conjunction with the accompanying drawings.

BRIEF DESCRIPTION OF THE DRAWINGS

FIGS. 1 to 5 are views of the display device as a function of the actual operating condition of the shifting mechanism;

DETAILED DESCRIPTION OF THE DRAWINGS

Figure 6:
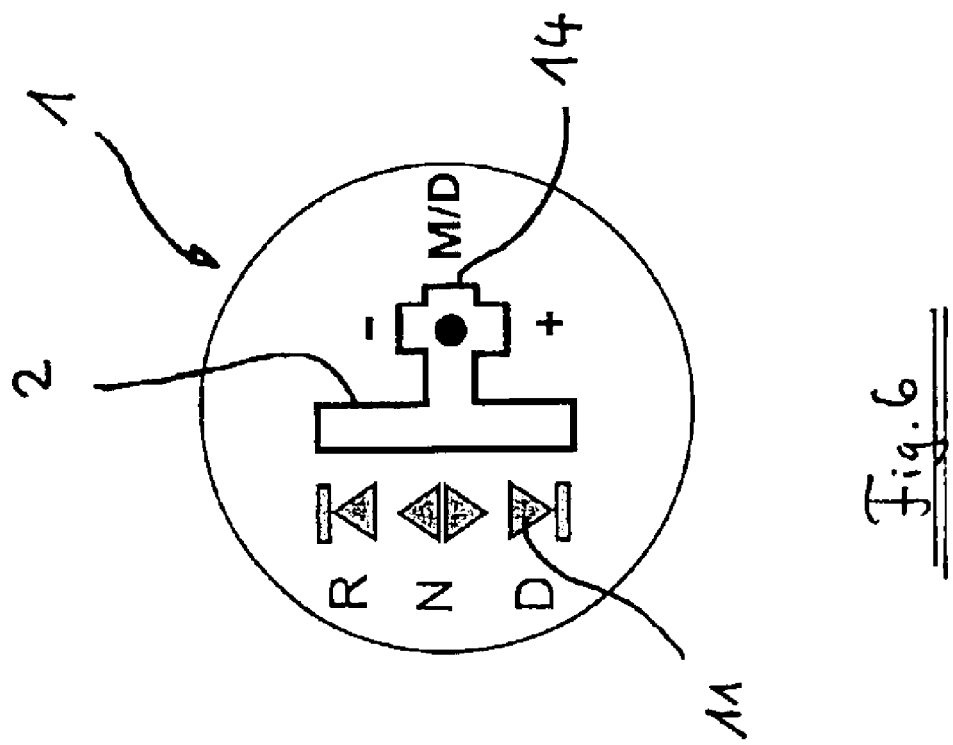
FIG. 6 shows an embodiment of the display device.

The shifting mechanism according to the invention has two shifting channels, specifically a first shifting channel which will also be called a right shifting channel or step-by-step shifting channel, and a second shifting channel which will be called a left shifting channel.

FIGS. 1 to 5 show a display device 1 which may be integrated, for example, in a center console of the vehicle and may be arranged next to the shift lever (not shown here). The shift lever is a monostable "joystick."

This means that the shift lever has a single stable position and is not directly mechanically coupled with the transmission but electrically controls the transmission. The shift lever can be moved from the stable position as a function of the actual operating condition into various deflected positions. As a function of the actual operating condition, the shift lever can be moved from the stable position into different deflected positions. The actual shifting diagram 2, which is a function of the actual operating condition, is displayed in the display device.

The stable position of the shift lever is illustrated in the shifting diagram 2 by a luminous marking 3. When the shift lever is moved from its stable position, it can be provided either that the luminous marking 3 is extinguished or that it "moves along" in the shifting diagram corresponding to the movement of the shift lever.

In FIGS. 1 to 5, the following operating conditions are schematically illustrated by display elements:

P: Parking condition

R: Reversing condition

N: Neutral condition

D: Drive condition (automatic mode with a comfortable shifting characteristic)

S/D: Sports program (automatic mode with a sporty shifting characteristic)

M: Step-by-step shifting mode in the step-by-step shifting condition.

In FIG. 1, the shifting mechanism is in the parking condition, which is indicated by a circle 4. The shifting mechanism is usually in the parking condition, for example, when the vehicle is started by means of the ignition key.

From the parking condition, a shift can take place by way of the shift lever into the reversing condition, the neutral condition or into the drive condition. For selecting the reversing condition, the shift lever must first be moved from its stable position, which is situated in a first shifting channel 5 (compare FIGS. 3 to 5), into a center position 6 of a second shifting channel 7. The first shifting channel 5 is not illustrated in FIGS. 1 and 2, which will be explained in detail in connection with FIGS. 3 to 5.

From the center position 6 of the second shifting channel 7, the shift lever can then be moved into a forward neutral position or a rearward neutral position, which positions are indicated in the shifting mechanism 1 by two black triangle symbols 8, 9. The triangle symbol 8 is assigned to the forward neutral position and the triangle symbol 9 is assigned to the rearward neutral position. The shift lever can then be moved farther in the second shifting channel 7 into a forward end position or a rearward end position, which positions are schematically indicated here by triangle symbols 10, 11.

When the shifting mechanism is in the parking condition (FIG. 1), the neutral condition can be optionally selected in that the shift lever is moved from its stable position in the first shifting channel toward the left and slightly forward or slightly rearward into the forward or rearward neutral position 8 or 9.

When a shifting is to take place from the parking condition into the reversing condition, the shift lever only has to be moved, as in the case of a conventional manual transmission, toward the forward left into the forward end position 10 of the second shifting channel. The forward neutral position is "overpressed" for selecting the reversing condition.

In a shift into the drive condition, the shift lever only has to be moved from its stable position toward the rearward left into the rearward end position 11. In this case, the rearward neutral position is overpressed.

FIG. 2 shows the display device 1 in the reversing condition. The shift lever was therefore moved out of the parking condition (FIG. 1) toward the forward left. After its release, the shift lever returns to its stable position. A circle 12 indicates that in FIG. 2 the reversing condition is active.

From the reversing condition, a shift into the neutral condition or into the drive condition can be made. In order to shift into the neutral condition, the shift lever has to be moved into the rearward neutral position 9. The forward neutral position 8 is deactivated in the reversing condition, which is schematically shown here by an unfilled triangle 8.

As an alternative, a shift from the reversing condition into the drive condition D can also be made by moving the shift lever to the black triangle 11 designating the rearward end position of the second shifting channel 7.

When the shift lever is moved toward the forward left, which is designated by the black triangle 10, the reversing condition is maintained. For reasons of safety, additional shifting possibilities from the reversing condition are not provided in this embodiment.

FIG. 3 shows the display device 1 while the shifting mechanism is in the drive condition D, which is designated by a circle 13. From the drive condition D, a shift can optionally take place into the reversing condition R, the neutral condition N, the step-by-step shifting condition (M Program) or the sports program (S Program). That a shift can also take place into the step-by-step shifting condition is illustrated by the fact that now the first shifting channel 5 is schematically illustrated in the display device 1. In addition, two step-by-step shifting symbols M− and M+ are illustrated which indicate that, in the step-by-step condition, by moving the shifting element in the first shifting channel toward the front, a downshift can be manually made and, by moving the shift lever toward the rear, an upshift can be manually made.

In order to reach the step-by-step shifting condition (M Program) from the drive condition D, the shift lever only has to be touched either once toward the front or once toward the rear in the first shifting channel. The step-by-step shifting condition (M Program) is illustrated in FIG. 4.

As an alternative, it is also possible to select the neutral condition from the drive condition D. For this purpose, the shift lever has to be shifted to the left into the second shifting channel and there into the forward neutral position 8.

As an alternative, a shift can also be carried out from the drive condition D into the reversing condition. For this purpose, the shift lever has to be moved from its neutral position in the first shifting channel toward the front left into the forward end position 10.

FIG. 5 shows the display device when the shifting mechanism is in the sports program, which is designated by the symbol "S/D" marked 14.

The sports program can be reached from the drive condition, for example, by actuating an operating element, such as an "S/D key." The operating element for selecting the sports program may be provided at the shift lever, in the area of the shift lever or at the steering wheel. It may also be integrated in the shift lever or be formed by the shift lever itself.

As an alternative or in addition, the sports program may be reached by moving the shift lever to the right (compare FIG. 6). Alternatively, with a transverse movement of the shift lever between the drive condition, the step-by-step condition (M Program) and the sports program (S Program), a change-over shift can take place.

In addition, the sports program can be first reached by shifting from the drive condition with a one-time operation of the shift lever in the first shifting channel, and the M Program can only be reached by another operation of the shift lever in the first shifting channel.

Although, in the operating condition (sports program) illustrated in FIG. 5, the transmission continues to be shifted automatically, the automatic system has a different shifting characteristics than in the drive condition D. The shifting characteristics in the shifting condition of FIG. 5 may be designed to be more sporty than the automatic mode of the drive condition. This means that, in the automatic mode of the step-by-step shifting condition, individual shifts take place at higher rotational speeds.

Furthermore, in the step-by-step shifting condition (FIG. 4), one or more limiting positions can be selected or are firmly defined. The term "limiting position" means that, during the manual upshifting or downshifting, the M Program is "limited" to an upper highest gear, for example, the fourth of six existing gears, and a lower gear, for example, the second gear, respectively. Thus, it may be provided that, in the step-by-step shifting condition, the transmission can be shifted back and forth only between gears two to four of a total of six provided forward gears.

FIG. 6 shows another embodiment of the invention in which, in contrast to the embodiment of FIGS. 1 to 5, another shifting possibility is provided. The shift lever can be moved from its stable position additionally to the right, which is illustrated in the shifting diagram 2 of the display device 1 by an indentation 14. When the shifting mechanism is in the step-by-step shifting condition, a shifting can take place into the drive condition, either by moving the shift lever into the end position toward the "rearward left" or by means of a simple transverse movement toward the right.

As an alternative, it may also be provided that generally a change-over shift can take place with a "transverse movement" of the shift lever between the automatic mode of the drive condition, the sports program and the manually shiftable step-by-step shifting condition.

Figure 7:
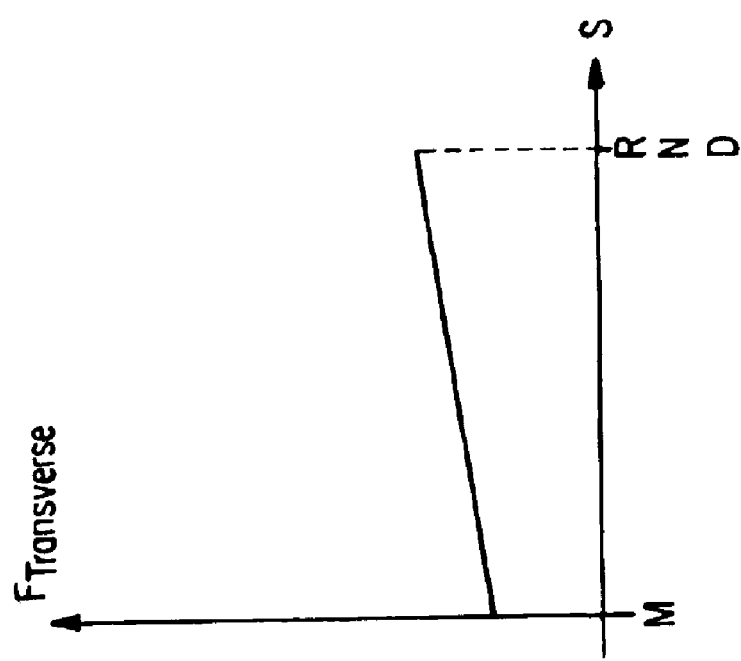
FIG. 7 shows a shifting force of the shifting element during a transverse movement from the stable position into the center position of the second shifting channel.

FIG. 7 shows a shifting force $F_{transverse}$ during a movement of the shift lever from the stable position in the first shifting channel into the center position 6 (compare FIG. 1) of the second shifting channel. In the embodiment illustrated here, the shifting force is a linear function of the deflecting path from the stable position and increases slightly from the stable position toward the center position of the second shifting channel.

Figure 8:
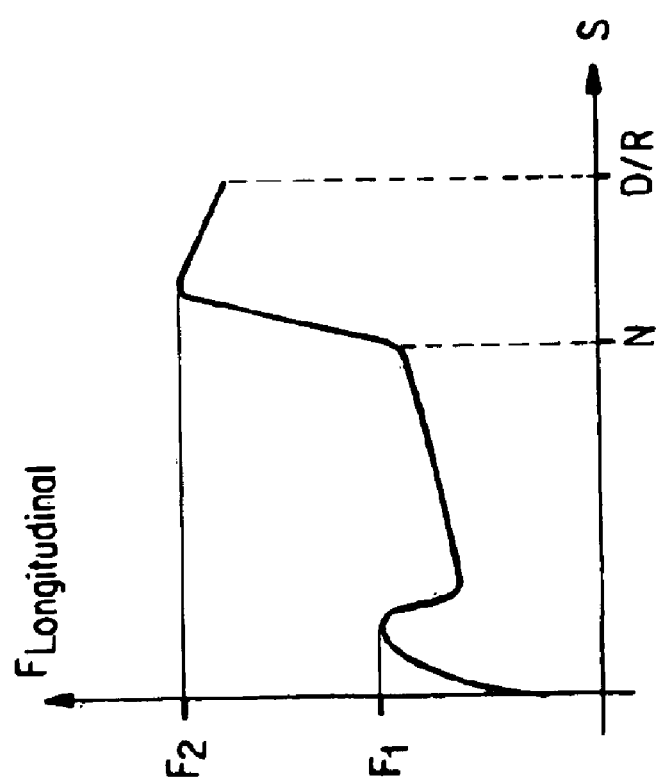
FIG. 8 shows the shifting force of the shifting element during a movement from the center position of the second shifting channel into any one of the two end positions.

FIG. 8 shows another shifting force $F_{longitudinal}$ during a movement of the shift lever in the second shifting channel from the center position 6 (compare FIG. 1) into the forward or rearward end position. Starting from the center position, the shifting force increases to a first shifting force maximum $F_1$. After this shifting force maximum $F_1$, the shifting force drops, which haptically indicates to the driver that the forward or rearward neutral position N has been reached. If the driver wants to shift further toward the front or rear into the drive condition or the reversing condition, he must apply a higher shifting force. The shifting force rises correspondingly to a second maximum $F_2$ and slightly decreases again when the forward or rearward end position is reached (compare FIGS. 1 to 5). When the driver releases the shift lever, the shift lever automatically returns to the stable position.

What is claimed:

1. A shifting mechanism comprising:
   a shifting element for selecting a plurality of shifting conditions, wherein the shifting conditions include a reversing condition, a neutral condition (N), a drive condition, a step-by-step shifting condition in which manual shifting of forward gears takes place;
   a first shifting channel for the shifting element; and
   a second shifting channel for the shifting element, wherein the shifting element has a stable position in the first shifting channel and is deflectable to select any one of the shifting conditions and for the manual shifting of the forward gears, and wherein the stable position in the first shifting channel is the only stable position of the shifting element and, after the shifting element is deflected and released, the shifting element automatically returns to the stable position.

2. The shifting mechanism according to claim 1, wherein the second shifting channel includes,
   a forward end position for selecting the reversing condition,
   a rearward end position for selecting the drive condition,
   a center position positioned between the end positions, wherein the center position is reachable by the shifting element from the stable position with a deflection of the shifting element in a direction transverse to the shifting channels,
   a forward neutral position for selecting the neutral condition from the drive condition or from the step-by-step shifting condition, the forward neutral position being positioned between the center position and the forward end position, and
   a rearward neutral position for selecting the neutral condition from the reversing condition, the rearward neutral position being positioned between the center position and the rearward end position.

3. The shifting mechanism according to claim 2, further comprising a first shifting force against a deflection of the shifting element from the stable position into the center position of the second shifting channel, wherein the first shifting force is essentially a linear function of the distance between the shifting element and the stable position.

4. The shifting mechanism according to claim 2, further comprising a second shifting force against a deflection of the shifting element from the center position of the second shifting channel, wherein the second shifting force includes a first shifting force maximum between the center position and the forward neutral position wherein the second shifting force includes a second shifting force maximum between the forward neutral position and the forward end position, and wherein the second shifting force maximum is greater than the first shifting force maximum.

5. The shifting mechanism according to claim 2, wherein a shift from the step-by-step shifting condition into the drive condition can be made by a first transverse movement of the shifting element from the stable position into the center position of the second shifting channel and then a longitudinal movement in the second shifting channel into the rearward end position, or by a second transverse movement of the shifting element from the stable position into a lateral deflected position which is positioned on a side of the first shifting channel that is opposite of the second shifting channel.

6. The shifting mechanism according to claim 2,
   wherein in the parking condition, with a deflection of the shifting element from the stable position to the forward neutral position, the neutral condition is selected and, by another deflection into the forward end position, the reversing condition is selected and the step-by-step shifting condition is blocked,
   wherein in the parking condition, with a deflection of the shifting element from the stable position to the rearward neutral position, the neutral condition is selected and, by another deflection into the rearward end position, the drive condition is selected and the step-by-step shifting condition is blocked,
   wherein in the reversing condition, with a deflection of the shifting element from the stable position into the rearward neutral position, the neutral condition is selected and, by another deflection into the rearward end position, the drive condition is selected and the step-by-step shifting condition is blocked,
   wherein in the neutral condition, with a deflection of the shifting element from the stable position into the forward end position, the reversing condition is selected,
   wherein in the neutral condition, with a deflection of the shifting element from the stable position into the rearward end position, the drive condition is selected and the step-by-step shifting condition is blocked,
   wherein in the drive condition, with a deflection of the shifting element from the stable position into the forward neutral position, the neutral condition is selected and, with another deflection into the forward end position, the reversing condition is selected
   wherein in the drive condition, with a deflection of the shifting element from the stable position in the longitudinal direction of the first shifting channel, the step-by-step shifting condition is selected and, by another deflection of the shifting element from the stable position in the longitudinal direction of the first shifting channel, a forward gear is manually selected.

7. The shifting mechanism according to claim 1, wherein the step-by-step shifting condition can be selected by deflecting the shifting element from the stable position in the longitudinal direction of the first shifting channel, and wherein the forward gears can be manually shifted by another deflection in the longitudinal direction of the first shifting channel in the step-by-step shifting condition.

8. The shifting mechanism according to claim 1, wherein the reversing condition can be deselected by deflecting the shifting element in the longitudinal direction of the first shifting channel into the neutral condition.

9. The shifting mechanism according to claim 1, wherein a shift out of the drive condition into a second automatic mode, whose shifting characteristics differ from shifting characteristic of the drive condition, takes place by deflecting the shifting element from the stable position in the first shifting channel, and wherein, for manual shifting of the forward gears or for activating the step-by-step shifting condition, another deflection of the shifting element in the first shifting channel is required.

10. The shifting mechanism according to claim 1, wherein the shifting channels are essentially parallel with respect to one another.

11. The shifting mechanism according to claim 1, further comprising a display device that includes a shifting diagram having possible deflecting positions of the shifting element from the stable position, and wherein the displace device is designed to show the current operating condition and deflecting positions which are currently selectable by the deflection of the shifting element for the current operating condition.

12. The shifting mechanism according to claim 11, wherein the displace device displays the actual operating condition in an optically highlighted manner in the shifting diagram with respect to the currently selectable operating conditions.

13. The shifting mechanism according to claim 11, wherein, in the drive condition and in the step-by-step shifting condition, the displace device displays at least one of display elements "M−" and "M+".

14. The shifting mechanism according to claim 11, wherein the displace device includes at least one of display elements "S/D" and "M", and wherein display element "S/F" indicates whether the second automatic mode is activated, and display element "M" indicates whether the step-by-step shifting mode is activated.

15. The shifting mechanism according to claim 11, wherein the shifting diagram includes a luminous marking which indicates the stable position of the shifting element, the luminous marking being extinguished when the shifting element is deflected from the stable position.

16. The shifting mechanism according to claim 11, wherein the shifting diagram includes a luminous marking which indicates the actual position of the shifting element during a movement of the shifting element from the stable position into one of the possible deflected positions.

17. The shifting mechanism according to claim 1, further comprising a limiting shifting position, with which, in the step-by-step shifting condition, the number of manually selectable forward gears is limited to a portion of the total existing forward gears.

18. The shifting mechanism according to claim 2, further comprising a second shifting force, against a deflection of the shifting element from the center position of the second shifting channel, wherein the second shifting force includes a first shifting force maximum between the center position and the rearward neutral position, wherein the second shifting force includes a second shifting force maximum between the rearward neutral position and the rearward end position, and wherein the second shifting force maximum is greater than the first shifting force maximum.

19. A method of making a shifting mechanism comprising the steps of providing a shifting element with a plurality of shifting conditions, wherein the shifting conditions include a reversing condition, a neutral condition, a drive condition, a step-by-step shifting condition in which manual shifting of forward gears takes place;

providing a first shifting channel for the shifting element;

providing the shifting element with a single stable position in the first shifting channel;

providing a second shifting channel for the shifting element;

making the shifting element deflectable to select any one of the shifting conditions and for the manual shifting of the forward gears; and providing that after the shifting element is deflected and released, the shifting element automatically returns to the stable position.

20. The method according to claim 19, further comprising the step of, providing the second shifting channel with a forward end position for selecting the reversing condition, a rearward end position for selecting the drive condition, a center position positioned between the end positions, wherein the center position is reachable by the shifting element from the stable position with a deflection of the shifting element in a direction transverse to the shifting channels, a forward neutral position for selecting the neutral condition from the drive condition or from the step-by-step shifting condition, the forward neutral position being positioned between the center position and the forward end position, and a rearward neutral position for selecting the neutral condition from the reversing condition, the rearward neutral position being positioned between the center position and the rearward end position; and making the shifting element deflectable into at least one of the positions.

* * * * *